United States Patent [19]

Bergmann

[11] Patent Number: 4,674,537
[45] Date of Patent: Jun. 23, 1987

[54] STRAIGHT-WAY & SHUT-OFF VALVE

[75] Inventor: Konrad Bergmann, Wittlich, Fed. Rep. of Germany

[73] Assignee: American Standard Inc., New York, N.Y.

[21] Appl. No.: 840,823

[22] Filed: Mar. 18, 1986

[30] Foreign Application Priority Data

Mar. 20, 1985 [DE] Fed. Rep. of Germany ........ 3509973
Mar. 20, 1985 [DE] Fed. Rep. of Germany ... 8508269[U]

[51] Int. Cl.⁴ .............................................. F16K 3/08
[52] U.S. Cl. ................... 137/625.31; 251/180; 251/208
[58] Field of Search ............... 137/625.31, 625.21; 251/208, 180

[56] References Cited

U.S. PATENT DOCUMENTS

| 1,761,595 | 6/1930 | Smolensky | 137/625.31 X |
| 4,549,579 | 10/1985 | Bergmann . | |
| 4,554,943 | 11/1985 | Claney et al. | 251/208 X |
| 4,554,948 | 11/1985 | Bergmann . | |

FOREIGN PATENT DOCUMENTS

| 896438 | 7/1949 | Fed. Rep. of Germany . | |
| 1103097 | 8/1958 | Fed. Rep. of Germany . | |
| 2945834 | 11/1980 | Fed. Rep. of Germany . | |
| 3309545 | 9/1984 | Fed. Rep. of Germany . | |
| 3309546 | 9/1984 | Fed. Rep. of Germany . | |
| 1216488 | 4/1960 | France | 137/625.31 |
| 1235296 | 5/1960 | France | 137/625.31 |

Primary Examiner—Arnold Rosenthal
Attorney, Agent, or Firm—James J. Salerno, Jr.; Robert G. Crooks; John P. Sinnott

[57] ABSTRACT

The present invention is directed to a straight-way and shut-off valve in which identical discs are arranged in face-to-face contact to provide a fluid-tight seal therebetween and means are provided whereby fluid is not trapped between the central rotatable disc and an outer disc so that upon expansion of the fluid, the discs do not shift outwardly due to axial pressure that would break the fluid-tight seal.

4 Claims, 12 Drawing Figures

STRAIGHT-WAY & SHUT-OFF VALVE

BACKGROUND OF THE DISCLOSURE

1. Field of the Invention

The invention relates to a straight-way and stop valve in which at least three identical discs are arranged in stacked, sealing engagement, with each disc having radial openings wherein the two outer discs are stationary while the central disc is rotatably mounted therebetween and has an actuating means coupled thereto.

2. Description of Prior Art

A disadvantage of known valves of this type is that when the valve is in its closed position and experiences a temperature rise, the fluid which is trapped in the passages in the central disc may expand so that the discs may separate from one another. This danger exists because the discs are formed with identical passages and, accordingly, have identical sealing surfaces so that the passages of the central disc, which are filled with fluid, are closed on both sides by the web-shaped sealing surfaces of the outer discs. A further disadvantage of such a design is that when the valve is opened, the flow of fluid entering the pack of discs leads to increased resistance to flow through the passages. Such a valve design encounters the problem that when the valve is in its throttled position, the fluid flows into the conduit at high speed and with high angular momentum at the discharge side of the valve.

The problems and disadvantages encountered are overcome by providing a straight-way and stop valve of the present invention which is reliable in operation and simple in construction.

SUMMARY OF THE INVENTION

A principal object of the invention is achieved by providing a straight-way valve assembly having at least three identically formed discs mounted in face-to-face sealing engagement with the central disc being rotatable therebetween, with each disc including a plurality of passages and the central disc having corresponding sealing surfaces on one face thereof to open and close the passages in one of the outer discs while the other face thereof has surfaces but does not simultaneously seal the passages in the outer disc when the valve is in its closed position. Accordingly, when the valve is in its closed position, no fluid is trapped in the passages between the outer discs and the central disc.

In a preferred embodiment of the invention, the passages in the discs are relatively widened or tapered from one side to the other, and the tapered sides of the passages can be blocked by the sealing surfaces between the tapered sides of the passages and the movable disc, while the sealing surfaces between the widened sides of the passages of the movable disc are reduced so that they do not cover the tapered or widened sides of the passages of the other disc. In accordance with the invention, the discs are arranged relative to one another so that the passages in the first outer disc taper in the direction of flow, resulting in a substantial reduction in resistance to flow when the valve is shifted from its closed to its opened-position. By this arrangement and design of the radial passages of the discs, substantial throttling takes place between the first two discs when the valve is partly opened and the rate of flow through the movable disc is at a considerably reduced speed. The reduction in the rate of flow is achieved because the gap between the movable disc and the other outer disc is larger in the throttled position. In addition, the angular momentum of the flow is also reduced thereby.

A further preferred embodiment is characterized in the claims.

DETAILED DESCRIPTION OF THE PREFERRED EMBODIMENT

Figure 1:
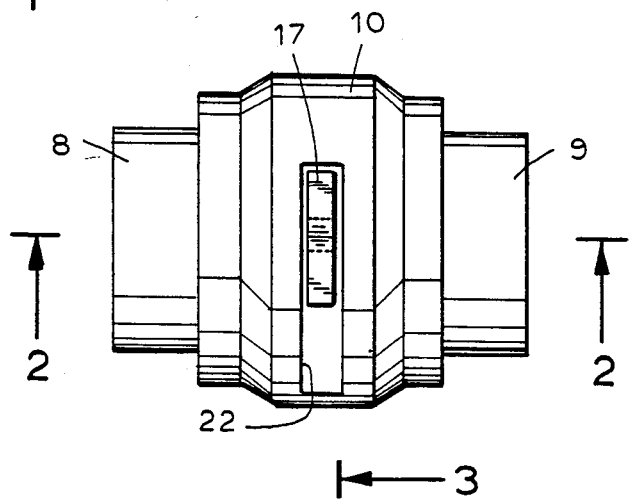
FIG. 1 is a top plan view of a straight-way valve assembly, illustrating one embodiment of the invention.
Figure 2:
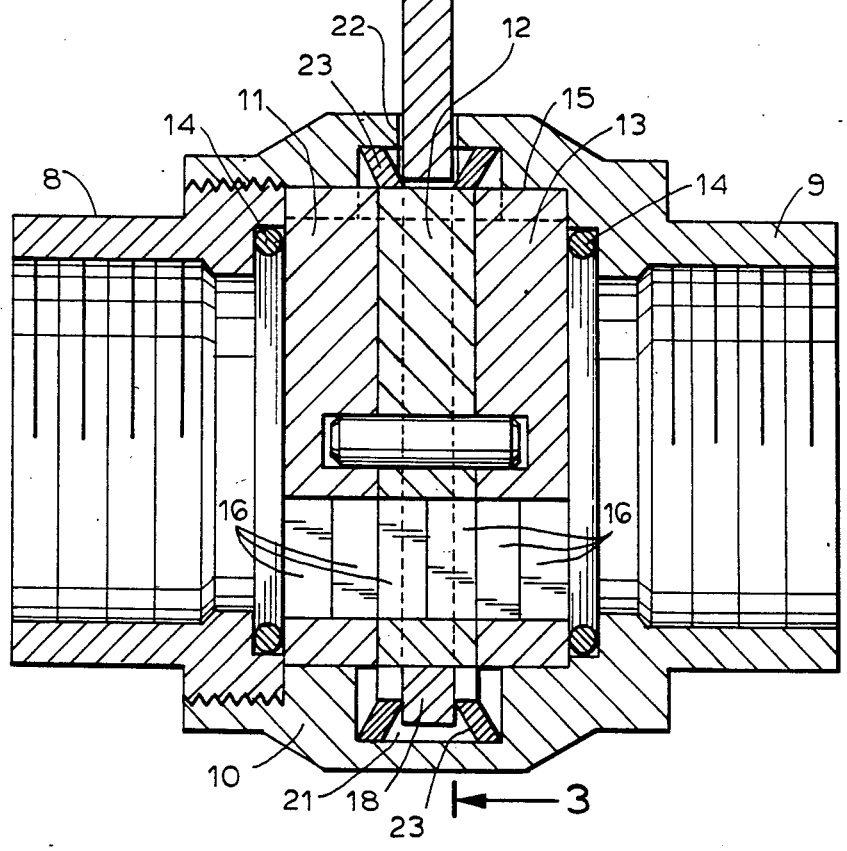
FIG. 2 is an elevational view, in section, of the valve assembly in its open position, taken along the lines 2—2 in FIG. 1.
Figure 3:
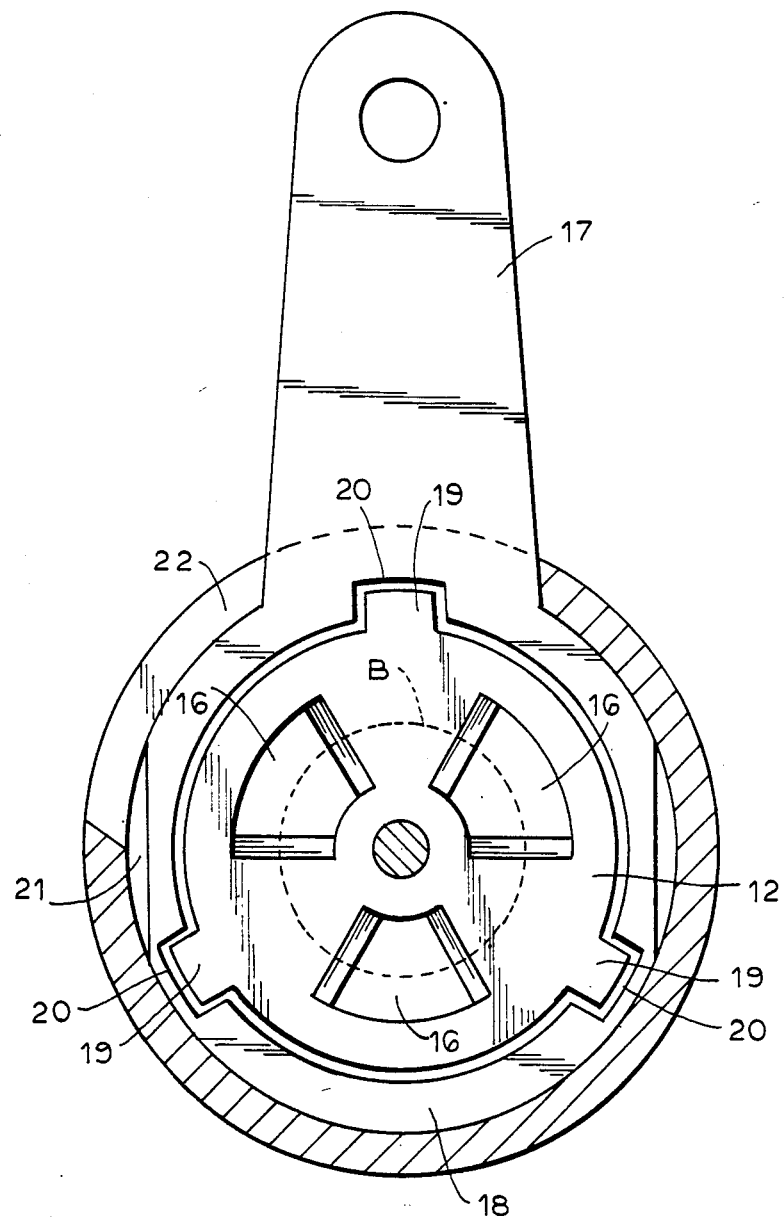
FIG. 3 is an elevational view, in section, taken along the lines 3—3 of FIG. 2.
Figure 4:
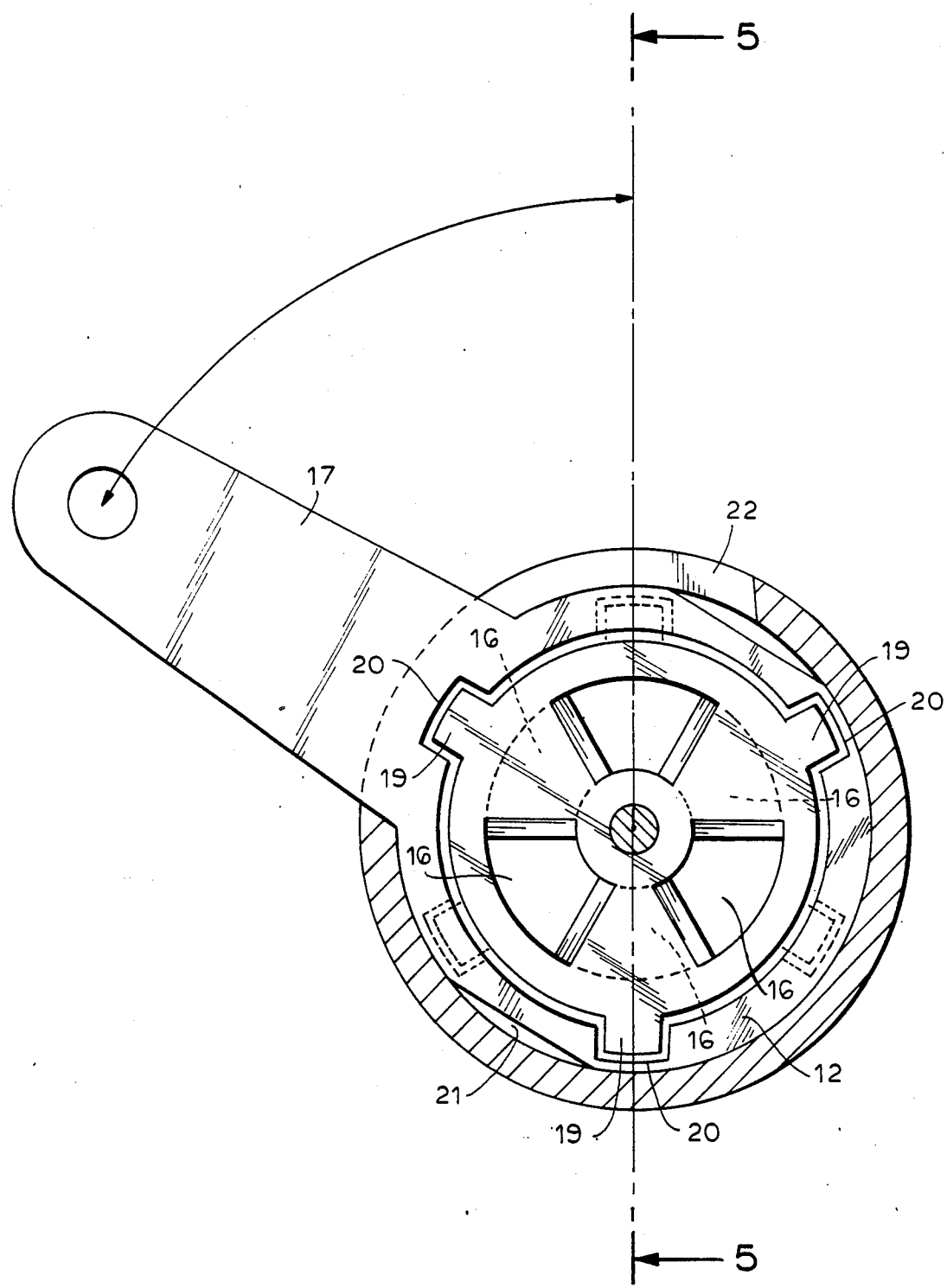
FIG. 4 is a view similar to FIG. 3, showing the valve assembly in its closed position.

FIGS. 1 through 9 show a straight-way valve which has two tubular pieces 8 and 9 coupled to a central housing 10 which operably mounts the valve control elements 2. Control elements 2 include three discs 11, 12 and 13, preferably made of a ceramic material, of which central disc 12 is rotatable. Discs 11, 12 and 13 are mounted in face-to-face contact with each other to provide a fluid-tight seal therebetween. Stationary outer discs 11 and 13 are held in compression against rotatable disc 12 by seal rings 14. Axle 15 is mounted in an axial bore of disc 12, the ends 5, 5' of which are rotatably mounted in maching recesses 7, 7' of stationary discs 11 and 13. Discs 11, 12 and 13 are provided with radial passages 16.

Movable disc 12 is connected to an actuating member 17 which has an annular portion 18 that encases movable disc 12. Disc 12 has lugs 19 engaging in grooves 20 in the annular portion 18 of the actuating member 17 to provide a positive locking connection with member 17 only in respect of the turning moment. Annular portion 18 is disposed in a circumferential groove 21 formed in valve housing 4, while the lever-shaped part of actuating member 17 projects outwardly through a longitudinal slot 22 in valve housing 4. Bearing rings 23, in the form of spring washers, are disposed in circumferential groove 21 of valve housing 4, which exert a resilient pressure on the annular part 18 of the actuating member 17 in an axial direction, thereby absorbing transverse forces.

Figure 5:
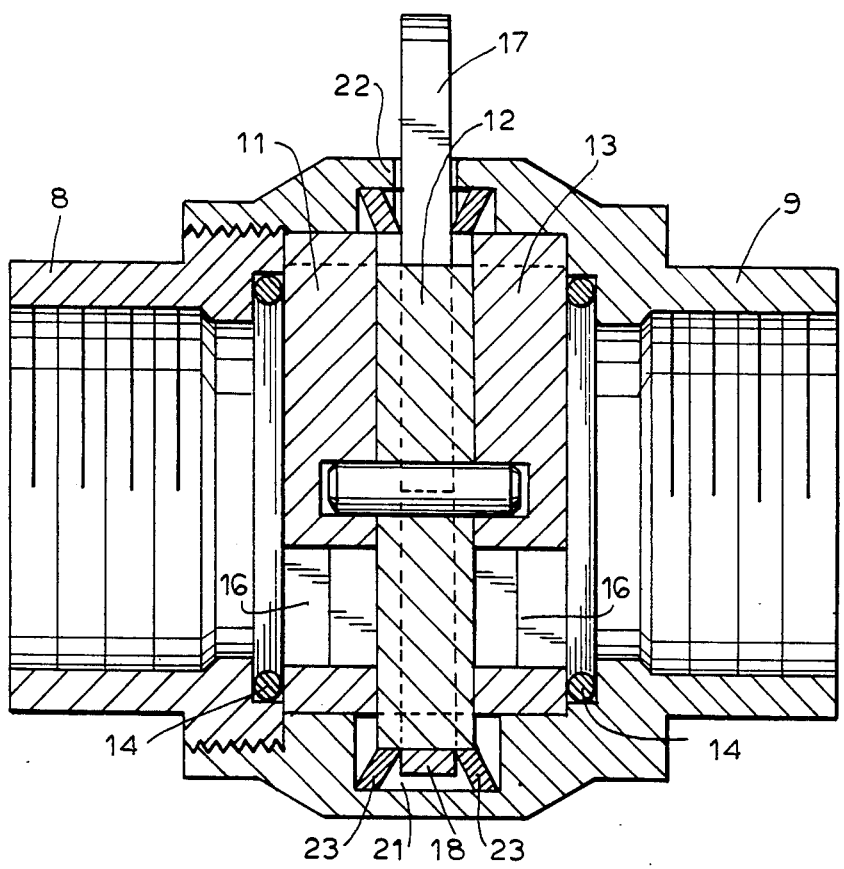
FIG. 5 is an elevational view, in section, similar to FIG. 2, illustrating the valve assembly in its closed position.
Figure 6:
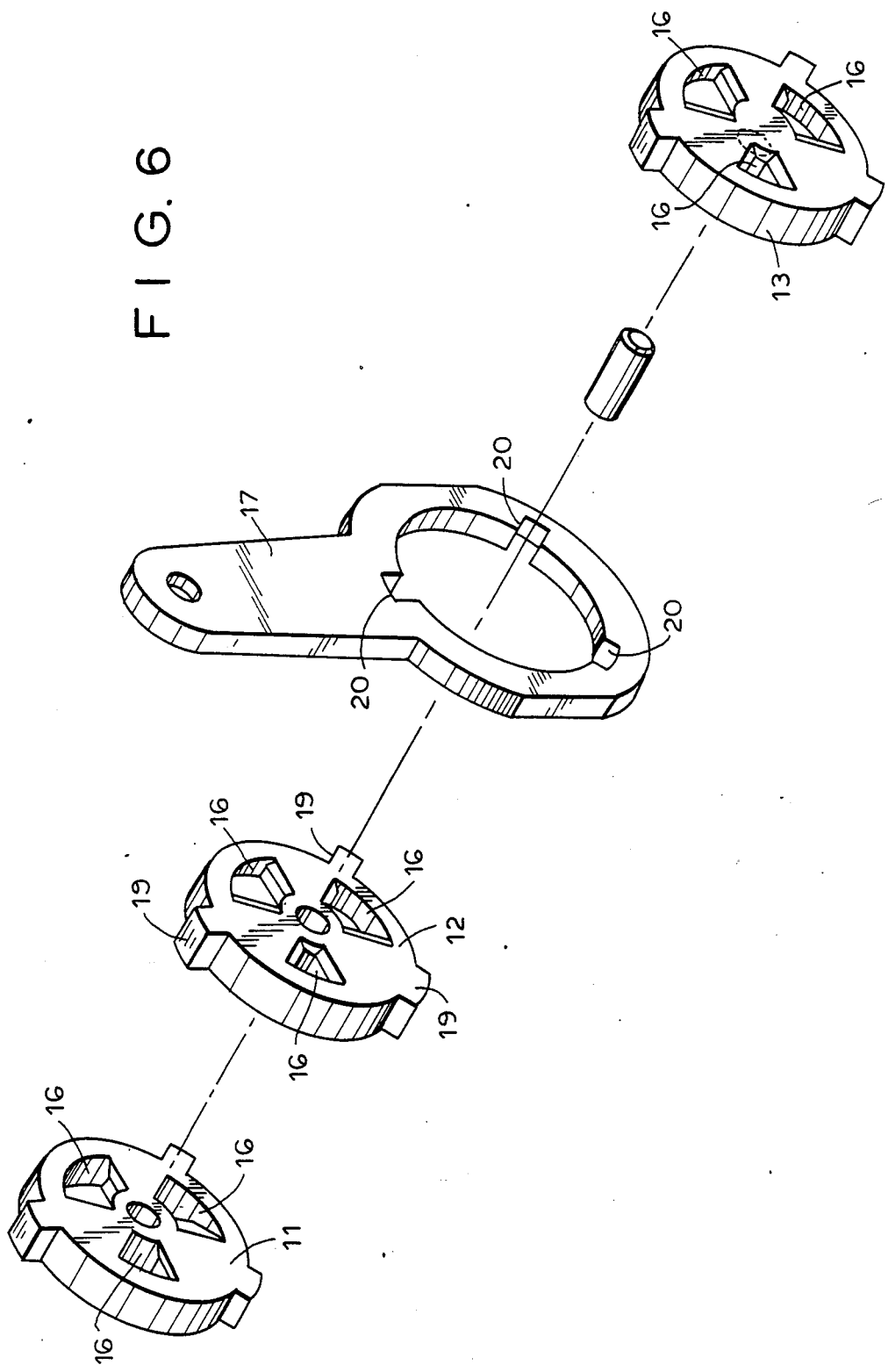
FIG. 6 is an exploded isometric view of the valving means with the housing removed.
Figure 7:
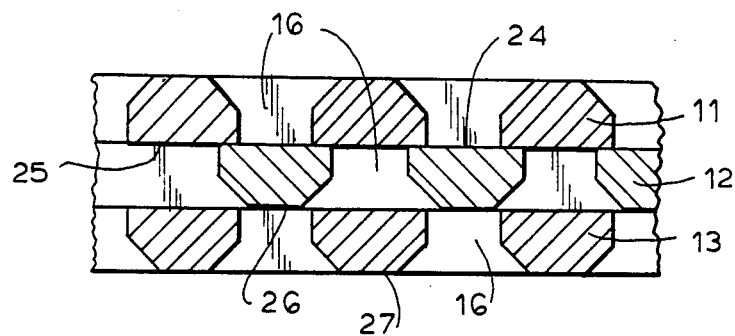
FIG. 7 is a fragmentary elevational view, in section, taken along the circle B of FIG. 3 with the valve in its closed position.
Figure 8:
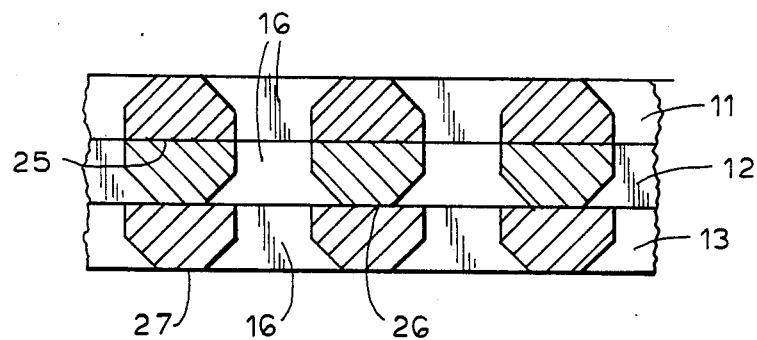
FIG. 8 is a view similar to FIG. 7 but with the valve in its open position.
Figure 9:
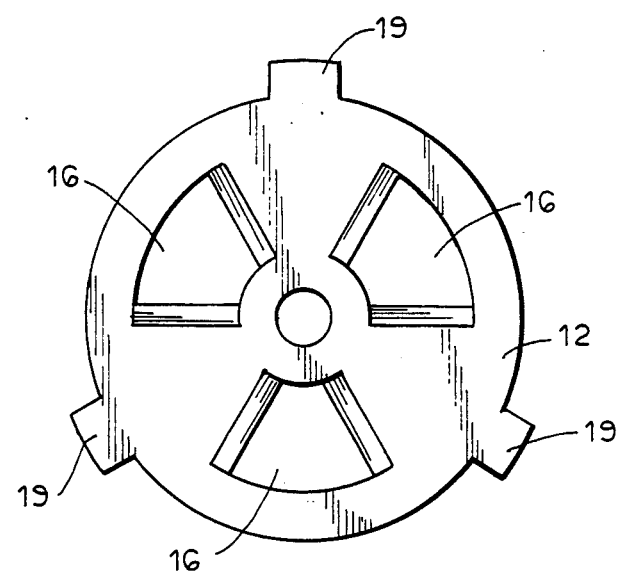
FIG. 9 is a plan view of each of the discs shown in isometric view of FIG. 6, as seen from the right side.

Discs 11, 12 and 13 are identical, most clearly shown in FIG. 6, and are constructed and arranged so that when the valve is in the closed position, FIG. 5, sealing surfaces 24 of movable disc 12 interact with the sealing surfaces 25 of one outer disc 11, while passages 16 in the central disc 12 simultaneously remain connected to, i.e. not sealed, the passages in the outer disc 13, see FIG. 7.

In the embodiment shown in FIGS. 1 to 9, passages 16 in the discs 11, 12 and 13 are widened or tapered from one side to the other. The passages 16 through the disc 11 can be blocked or sealed at their tapered sides by the sealing surfaces 24, 25, while the sealing surfaces 26, 27 at the wide-passage side of the discs are reduced so that they can partly cover only the tapered or widened sides of the passages 16, see FIG. 8.

Figure 11:
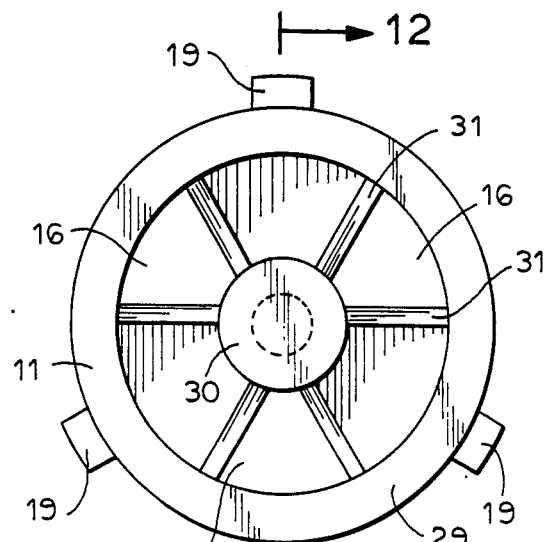
FIG. 11 is a plan view, as seen from the right side of FIG. 10, of another form of the disc.
Figure 12:
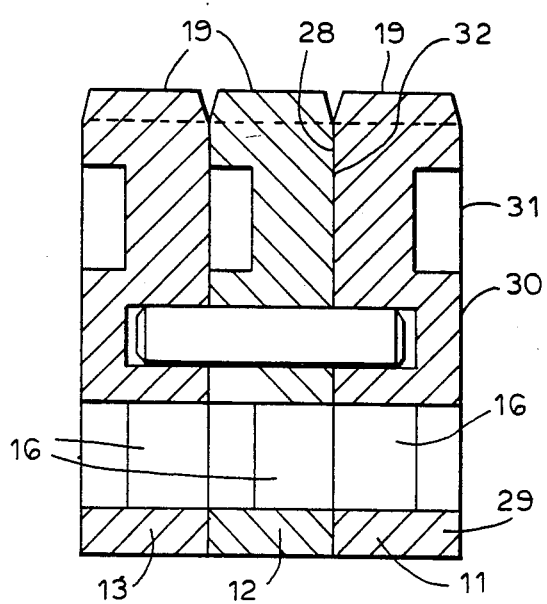
FIG. 12 is an elevational view, in section, taken along the lines 12—12 of FIG. 11.
Figure 10:
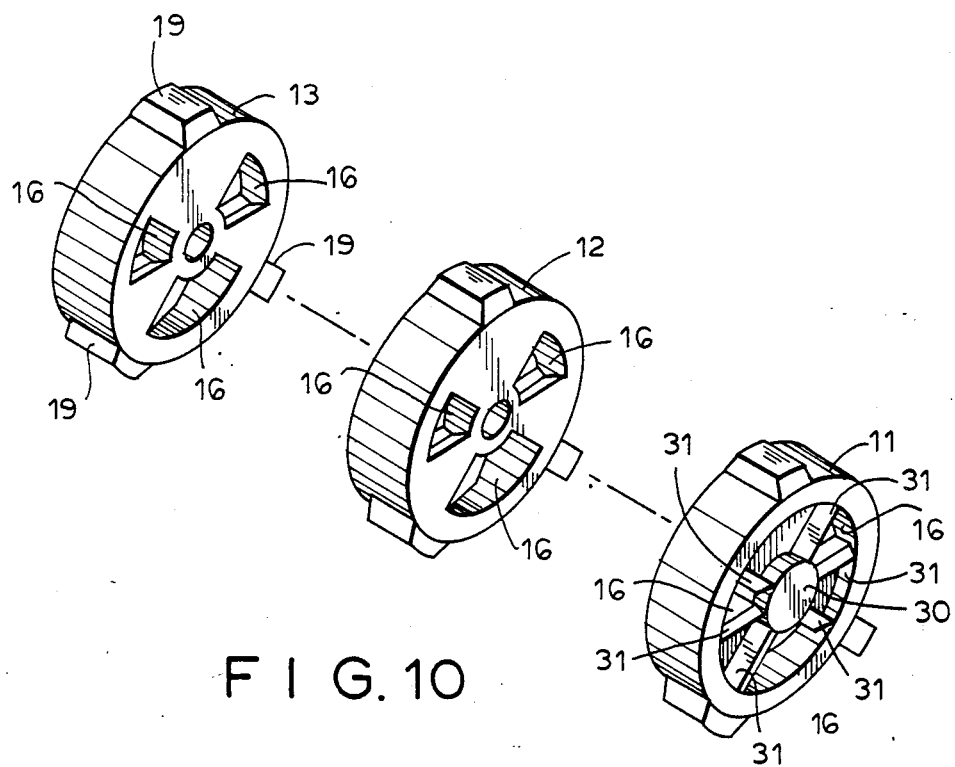
FIG. 10 is an alternate form of the discs shown in exploded isometric view without the housing and handle shown in FIG. 6.

In the embodiment shown in FIGS. 10 through 12, discs 11, 12 and 13 have a continuous sealing surface 28, 32 on one side. On the other side, they have a protruding sealing surface 29 which surrounds the passages 16 in the outer section of the discs 11, 12 and 13 and which is in the same plane as a central bearing surface 30, while the web surfaces 31 are set back from that plane.

In accordance with the invention, no fluid will be trapped between the two outer discs 11 and 13.

Straight-way valve 1 is not difficult to manufacture and is easy to assemble. Straight-way valve 1 is suitable for pipe systems that conduct water or oil to machines that become heated during operation. Straight-way valve 1 avoids trapping gasses which would cause an axial pressure that would force the discs outward and break the fluid-tight seal.

The embodiments described and illustrated are by way of examples only and the invention should be restricted to them. Variation of design and other changes may be made without departing from the framework of the invention, particularly, in respect of the construction and arrangement of the discs.

It is claimed:

1. A straightway valve comprising:
    a valve body;
    at least three identically formed discs, having complimentary sealing surfaces around their respective peripheries, positioned in said valve body in stacked face-to-face, fluid-tight engagement, with the central disc being rotatable between each end disc;
    each of said discs having a plurality of radially spaced-apart passages and a plurality of radially spaced-apart sealing surfaces formed therebetween;
    each of said passages of said discs having a cross sectional area greater on one face of said disc than on said other face thereof, and each of said sealing surfaces on said one face of said discs having a cross sectional area less than the sealing surfaces on said other face thereof;
    said one face of said central disc and an adjacent face of one of said end discs having corresponding passages and sealing surfaces to provide a fluid-tight seal therebetween when said valve is in its closed position;
    the other face of said central disc and the adjacent face of said other end disc being mounted in fluid-tight sealing engagement around the periphery thereof, with said passageways of said central disc out of sealing engagement with said sealing surfaces of said other end disc so as to provide vent means for passage of said fluid through said valve body, thereby relieving pressure build-up when said valve assembly is in its closed position.

2. The assembly of claim 1, wherein said passages in said at least three discs are tapered, respectively, from one face to the other and said one end disc being sealed by said sealing surfaces of said rotatable disc when said valve is in its closed position, while said sealing surfaces on the other face of said rotatable disc and said passages of said other end disc are out of registry, thereby providing a vent passage to prevent pressure buildup in said valve body.

3. The assembly of claim 1, wherein said rotatable disc includes a sealing surface around its periphery on both faces thereon and forms a fluid-tight seal between the corresponding circumferentially formed sealing surface on both of said end discs, one face of said central disc having sealing surfaces disposed between said passages to provide a fluid-tight seal with the passages of said one end disc while, on the other face thereof, said sealing surfaces formed between said passages of said rotatable disc are out of registry when the valve is in its closed position.

4. A straightway valve assembly comprising a housing having at least three identical discs disposed therein with the outer two discs thereof being mounted in fixed position, and said central disc rotatably mounted therebetween, each of said at least three discs includes a plurality of radially disposed passages and a plurality of sealing surfaces formed therebetween;
    said sealing surfaces of said central disc shaped to cover corresponding radial passages of one of said outer discs in a fluid-tight seal when said valve is in its closed position, while the sealing surfaces on the opposite face of said central disc and the corresponding passages are out of registry relative to the corresponding radial passages and sealing surfaces of said outer disc to prevent pressure building up when said valve is in its closed position.

* * * * *